US012158795B2

(12) United States Patent
Manevich et al.

(10) Patent No.: US 12,158,795 B2
(45) Date of Patent: Dec. 3, 2024

(54) INTELLIGENT EXPOSURE OF HARDWARE LATENCY STATISTICS WITHIN AN ELECTRONIC DEVICE OR SYSTEM

(71) Applicant: Mellanox Technologies, Ltd., Yokneam (IL)

(72) Inventors: Natan Manevich, Ramat HaSharon (IL); Dotan David Levi, Kiryat Motzkin (IL); Shay Aisman, Zichron Yaakov (IL); Ariel Almog, Kohav Yair (IL); Ran Avraham Koren, Beijing (CN)

(73) Assignee: Mellanox Technologies, Ltd., Yokneam (IL)

( * ) Notice: Subject to any disclaimer, the term of this patent is extended or adjusted under 35 U.S.C. 154(b) by 76 days.

(21) Appl. No.: 18/074,751

(22) Filed: Dec. 5, 2022

(65) Prior Publication Data

US 2024/0134731 A1 Apr. 25, 2024
US 2024/0231984 A9 Jul. 11, 2024

(30) Foreign Application Priority Data

Oct. 24, 2022 (CN) .......................... 202211305236.7

(51) Int. Cl.
*G06F 1/04* (2006.01)
*G06F 11/07* (2006.01)

(52) U.S. Cl.
CPC ...... *G06F 11/0757* (2013.01); *G06F 11/0736* (2013.01)

(58) Field of Classification Search
CPC .... G06F 1/14; G06F 11/0757; G06F 11/0736; G06F 11/3452
See application file for complete search history.

(56) References Cited

U.S. PATENT DOCUMENTS

| | | | |
|---|---|---|---|
| 2015/0373017 A1* | 12/2015 | Oelke | H04L 63/0807 710/17 |
| 2020/0110692 A1* | 4/2020 | Senin | G06F 11/3419 |
| 2023/0315297 A1* | 10/2023 | Oh | G11C 11/4076 711/154 |

* cited by examiner

*Primary Examiner* — Nitin C Patel
(74) *Attorney, Agent, or Firm* — Lowenstein Sandler LLP

(57) ABSTRACT

A device includes a hardware block to perform a hardware process and internal logic coupled between a processing device, which executes instructions, and the hardware block. The internal logic can one of measure execution time or count clock cycles of at least a portion of the hardware process. The internal logic can further, in response to the measured execution time or the counted clock cycles satisfying a predetermined condition, provide data associated with the one of the execution time measurement or the clock cycles count to the processing device, the data being statistically indicative of a latency of data packets sent by the hardware process over a total time the hardware process executes.

37 Claims, 7 Drawing Sheets

INTELLIGENT EXPOSURE OF HARDWARE LATENCY STATISTICS WITHIN AN ELECTRONIC DEVICE OR SYSTEM

RELATED APPLICATION

The present application claims priority, pursuant to 35 U.S.C. 119(a), to Chinese Patent Application No. 202211305236.7, filed Oct. 24, 2022, which is incorporated herein in its entirety by this reference.

TECHNICAL FIELD

At least one embodiment pertains to processing resources used to perform and facilitate debug and diagnostics of hardware systems. For example, at least one embodiment pertains to technology for intelligent exposure of hardware latency statistics within an electronic device or system.

BACKGROUND

Within both computing devices and networking devices, exposure of internal hardware information, diagnostics, and statistics remains a challenge in the hardware industry. Such information is employed to understand internal behavior and processes running on the hardware and provide valuable information to debug and stabilize hardware performance. Several approaches to exposing internal diagnostics and statistics exist, such as diagnostics counters and event loggers, but these approaches are deficient in several aspects.

BRIEF DESCRIPTION OF DRAWINGS

Various embodiments in accordance with the present disclosure will be described with reference to the drawings, in which.

DETAILED DESCRIPTION

Figure 1:
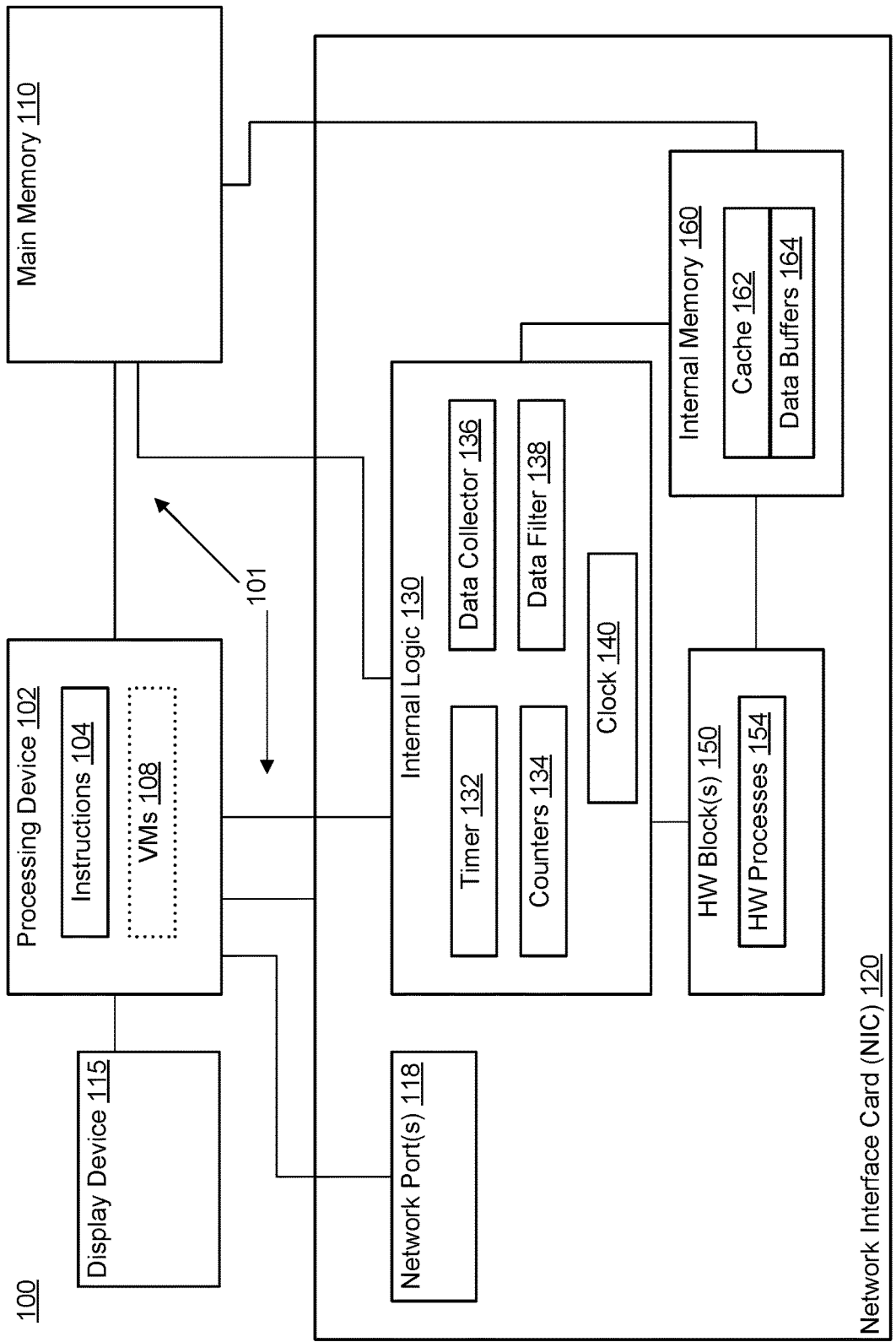
FIG. 1 is a block diagram of an electronic device configured for intelligent exposure of hardware latency statistics, in accordance with at least some embodiments.

As described above, some approaches to expose internal diagnostics and statistics exist, such as diagnostics counters and event loggers aspects. Diagnostics counters generally allow counting occurrence of internal events in a given time. For example, the number of cache misses that occurred in a second, or the number of packets sent on the first network port, or a number of cache hits or accesses in a given time, for example. Several occurrences of internal events may usually be counted in parallel. Data from diagnostic counters, however, does not provide latency-related information. Event loggers generally allow exposing metadata of an internal event. This is a per-event exposure, versus the aggregation approach used in the diagnostic counters case. For example, in the case of packets sent on a network port, the metadata may include port number, packet length, packet priority, work queue of the packet, transmission time, and the like. Every packet causes the metadata to be copied to main memory (e.g., of a host) for further analysis and diagnostics.

Diagnostics counters expose little data, which may not be enough to deeply understand internal behaviors, and in particular, latency-related statistics and related behaviors. Event loggers, on the other hand, expose a significant amount data, which typically cannot be handled in real time and can theoretically overwhelm any system or device attempting to process so much data in real time. Thus, processing event loggers data is more suitable for an offline debug. In addition, sending metadata of the logged events to the main memory can have meaningful impact on system performance, e.g., can use up a significant amount of main memory, and utilize a significant amount of bandwidth of the communication channel, such as a Peripheral Component Interconnect Express (PCIe) channel or chip-to-chip (C2C) bus.

Aspects and embodiments of the present disclosure address the deficiencies of existing approaches for exposing internal diagnostics and statistics of an electronic system (or device) by interacting with and delegating to hardware the sampling of a sufficient amount of data (e.g., metadata) to determine latency statistics associated with a hardware process. For example, instructions (e.g., an application or program) being executed on the electronic system or device may program internal logic of hardware to measure execution time of a least a portion of the hardware process. In response to the measured execution time satisfying a predetermined condition, the internal logic may provide data associated with the execution time measurement to a processing device, e.g., that executes instructions. The data may be understood as statistically indicative of a latency of data packets sent by the hardware process over a total time the hardware process executes. The latency may also be related to other sub-processes of the hardware process such as block encryption or decryption. Thus, the processing device may process the data to determine at least one statistical value corresponding to the latency. The statistical value may include, for example, at least one of an average latency, a median latency, a maximum latency, and/or a minimum latency.

In at least one related embodiment, internal logic of hardware of a device may initiate a time measurement during execution of a hardware process of the hardware. The internal logic of the hardware may further increment an event counter for each event that occurs that is associated with the hardware process. Responsive to detecting a predetermined condition associated with at least one of the time measurement or the event counter, the internal logic may process data associated with the time measurement and the event counter to determine at least one statistical value corresponding to a latency of the hardware process execution. The at least one statistical value may include at least one of an average latency, a median latency, a maximum latency, or a minimum latency. The internal logic may further provide the statistical value to a processing device of the device, the processing device configured to execute instructions that make up a software program, application, or the like. Thus, the statistical value may be passed to a user application such as to a virtual machine running on the processing device.

Advantages of the present disclosure include but are not limited to improving the speed and ability to access debug or diagnostic data associated with hardware performance and the ability to process such data in the generation of latency-related statistics. In at least some embodiments, what before could only be done offline, may now be performed online within the system or device and in real time by sampling latency-related data that is statistically representative of overall latencies, for example. Internal diagnostics and visibility to hardware processes enable achieving highly optimized solutions, detecting and avoiding possible bottlenecks in data flow, and efficiently debugging underperforming systems. Other advantages will be apparent to those skilled in the art of intelligent systems and devices discussed hereinafter.

FIG. 1 is a block diagram of an electronic device 100 (or system) configured for intelligent exposure of hardware latency statistics, in accordance with at least some embodiments. In at least some embodiments, the electronic device 100 includes a processing device 102 adapted to execute instructions 104, a main memory 110 (e.g., host memory), a display device 115, and a network interface card (NIC) 120. The processing device 102 may include at least one central processing unit (CPU), at least one graphics processing unit (GPU), or a combination thereof. In these embodiments, the processing device 102, the main memory 110, and the NIC 120 are coupled together through one or more interface buses 101 such as a PCIe bus or channel, a C2C bus, an NVLink, or a combination thereof. The main memory 110 may generally be understood to be less expensive, slower access memory such as Dynamic Random Access Memory (DRAM) or the like. When executed, the instructions 104 may enable running operations systems, or more virtual machines (VMs) 108, and other applications and software of a computing system.

In these and related embodiments, the NIC 120 includes network ports 118, internal logic 130, multiple hardware blocks 150 (e.g., which may be implemented as a hardware pipeline in some embodiments), and internal memory 160. In various embodiments, the multiple hardware blocks 150 include packet processing hardware such as match-action tables, cryptographic hardware, other authentication and/or security hardware, cache access control hardware, and the like.

In some embodiments, the internal logic 130 is coupled between the processing device 102 and the hardware blocks 150 and include, but are not limited to, a timer 132 (which may include time-keeping hardware, such as a physical clock), counters 134, a data collector 136, a data filter 138, and a clock 140. In at least one embodiment, the internal logic 130 includes or is coupled to the clock 140, which can be a hardware clock. In some embodiments, the hardware blocks 150 are adapted to perform a number of hardware processes 154 that process data and generate data packets during such execution. In some embodiments, the NIC 120 also packages user data within data packets that are adapted to be sent over the network ports 118, e.g., to be passed to a network such as the internet. In some embodiments, the timer 132 and/or the counters 134 are located outside of the internal logic 130, but are coupled to and accessible by the internal logic.

In at least some embodiments, the internal memory 160 may further include cache 162 and data buffers 164, where in some embodiments, the data buffers 164 are located within the cache 162. The internal memory 160 may generally be understood to be more expensive, faster access memory such as Static Random Access Memory (SRAM), tightly-coupled memory (TCM), or the like. In some embodiments, at least a portion of the NIC 120 is instantiated on-chip or die of the processing device 102 for fast access, but is illustrated separately for simplicity of illustration and explanation. For example, at least a portion of the cache 162 (such as lower level of cache such as at least level one (L1) and level two (L2)) may be located next to processor cores of the processing device 102 that is executing the instructions 104. In order to enable fast access to all of the hardware components, the other hardware components of the NIC 120 may also be located on-chip or die of the processing device.

Further, in at least some embodiments, NIC 120 or other intelligent network adapter, is located on a single printed circuit board (PCB) on which the processing device 102 is located. Processing cores of the processing device 102 as well as hardware of the NIC 120 may instantiate a network device that is configured to intelligently provide many network packet-related services, which may be offloaded from a server or other networked computing devices or systems (e.g., which may be located in a data center). In these embodiments, the electronic device 100 (or system) may be referred to as an intelligent network device or as a data processing unit (DPU). In some embodiments, therefore, the hardware blocks 150 may be a part of or contribute to at least one of a NIC, a DPU, a GPU, or a CPU.

In various embodiments, the components illustrated in FIG. 1 are exemplary and more or fewer of these components may exist in any given system or device, to include a computing device or a communication device. For example, the processing device 102, the NIC 120, or a combination thereof, may include a memory management unit (MMU) that interacts with and controls data that is stored within the cache 162, the data buffers 164, and/or the main memory 110, as may be typical of single-processing or parallel-processing architectures of the processing device 102. Further, the electronic device 100 (or system) may include additional DPU-related components not specifically referenced in the current disclosure. The functionality of the various components of the electronic device 100 (or system) of FIG. 1 will be discussed in more detail with reference to FIGS. 2A-5. The operations discussed within the various flow charts of the disclosed methods may be performed in different orders than illustrated and may be performed in different combinations of the various operations across the various flow charts unless a specific order or subset of operations is explicitly required.

Figure 2A:
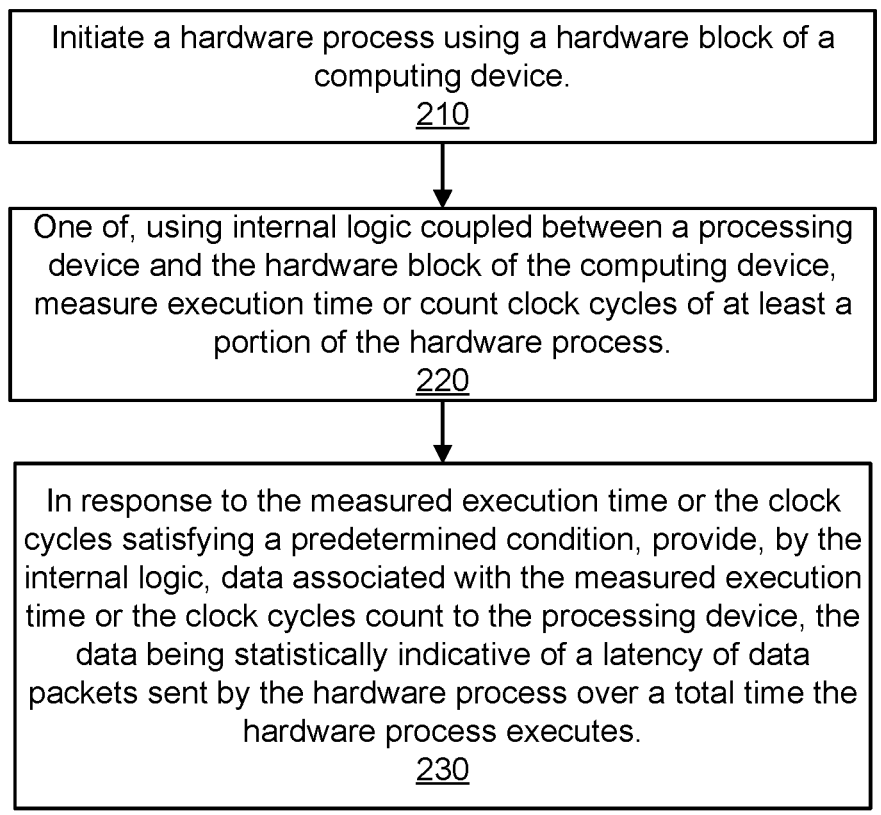
FIG. 2A is a flow diagram of a method for intelligent exposure of hardware latency statistics within an electronic device, in accordance with at least some embodiments.

FIG. 2A is a flow diagram of a method 200A for intelligent exposure of hardware latency statistics within an electronic device, in accordance with at least some embodiments. The method 200A can be performed by processing logic comprising hardware, software, firmware, or any combination thereof. In at least one embodiment, the method 200A is performed by the electronic device 100 (or system) of FIG. 1, and particularly by the NIC 120, as may be directed by the processing device 102. In at least some embodiments, the data collector 136 and/or other components of the internal logic 130 perform one or more operations.

At operation 210, processing logic (e.g., the internal logic 130) initiates a hardware process using a hardware block of an electronic device. In one embodiment, the hardware process is one of the hardware processes 154 and the hardware block is one of the hardware blocks 150.

At operation 220, internal logic measures execution time or counts clock cycles of at least a portion of the hardware process. Operation 220 may be performed using the internal logic 130 that is coupled between the processing device 102 and the hardware block 154 of the electronic device 100. In at least one embodiment, measuring the execution time includes initiating and tracking the timer 132, and in response to the timer 132 satisfying a threshold time, providing the data associated with the timer 132 to the processing device 102. In some embodiments, the threshold time is a fraction of the total time that the hardware process 154 executes, and is thus associated with a sampling time sufficient to obtain enough data from which to derive statistical significance. In at least one additional embodiment, counting the clock cycles includes tracking clock cycles of the clock 140 during execution of the hardware process, and in response to the clock cycles satisfying a threshold number of clock cycles, providing the data associated with the clock to the processing device. In some embodiments, the threshold number of clock cycles is a fraction of total clock cycles over which the hardware process executes, and is thus associated with a sampling period sufficient to obtain enough data from which to derive statistical significance.

At operation 230, in response to the measured execution time or the counted clock cycles satisfying a predetermined condition, the internal logic provides data associated with the measured execution time to the processing device 102. In some embodiments, the data is metadata that is statistically indicative of a latency of data packets sent by the hardware process 154 over a total time the hardware process 154 executes. Another hardware process can be, for example, the process of accessing an internal hardware memory cache such as the cache 162. The data can indicate the latency of accessing the cache 162. A cache miss, for example, may result in a measurement of a high latency. Other examples may include PCI latency, work descriptor fetch, work data fetch, time to transmit a packet once all data sits in internal hardware buffers, time to scatter a received packet to memory, external memory access after cache miss. Providing the data to the processing device may be implemented in more than one way. In at least one embodiments, providing the data includes storing the data to the internal memory 160 of the internal logic 130 and sending an interrupt to the processing device 102 that indicates availability of the data. In at least another embodiment, providing the data includes receiving a request for the data from the processing device 102 and replying to the request with a message containing the data.

After operation 230, the processing device 102 is now in possession of the data and may process the data to determine at least one statistical value corresponding to the latency. For example, the statistical value may include at least one of an average latency, a median latency, a maximum latency, or a minimum latency. The average latency may be derived, for example, from a total measure of latency over a number of measured events.

Figure 2B:
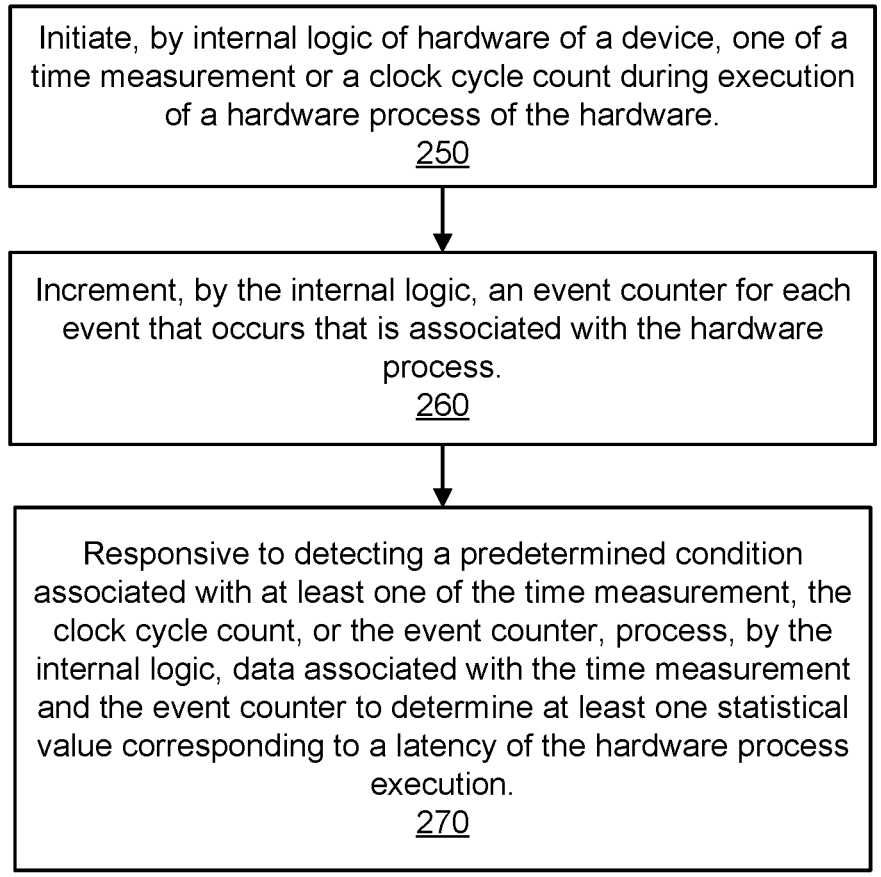
FIG. 2B is a flow diagram of a method for intelligent exposure of hardware latency statistics within an electronic device, in accordance with at least additional embodiments.

FIG. 2B is a flow diagram of a method 200B for intelligent exposure of hardware latency statistics within an electronic device, in accordance with at least additional embodiments. The method 200B can be performed by processing logic comprising hardware, software, firmware, or any combination thereof. In at least one embodiment, the method 200B is performed by the electronic device 100 (or system) of FIG. 1, and particularly by the NIC 120, as may be directed by the processing device 102. In at least some embodiments, the data collector 136 and/or other components of the internal logic 130 perform one or more operations.

At operation 250, the internal logic 130 initiates one of a time measurement or a clock cycle count during execution of a hardware process of the NIC 120. In some embodiments, initiating the time measurement includes initiating the timer 132. In some embodiments, initiating the clock cycle count includes recording a time on a hardware clock such as the clock 140 (FIG. 1).

At operation 260, the internal logic 130 increments an event counter for each event that occurs that is associated with the hardware process. In these embodiments, the event counter is one of the counters 134 illustrated in FIG. 1 within the internal logic 130. In addition to the operation 260, the processing logic (e.g., the internal logic 130) may further detect each event as a data packet or a group of data packets sent by the hardware process. The processing logic may further detect each event as a data block encryption (or decryption) of data being processed by the hardware process 154.

At operation 270, responsive to detecting a predetermined condition associated with at least one of the time measurement, the clock cycle count, or the event counter, the internal logic processes data associated with the time measurement and the event counter to determine at least one statistical value corresponding to a latency of the hardware process execution. Detecting the predetermined condition may include one of the timer 132 satisfying a threshold time or the event counter 134 satisfying a threshold number of events. In some embodiments, the data is metadata that is statistically indicative of a latency of data packets sent by the hardware process 154 over a total time the hardware process 154 executes. In various embodiments, the statistical value includes at least one of an average latency, a median latency, a maximum latency, or a minimum latency.

After operation 270, the internal logic may further provide the at least one statistical value to the processing device 102 of the electronic device 100 (or system), which processing device 102 is configured to execute instructions of various user applications and the like. In this way, the statistical value may efficiently and quickly be determined by the internal logic 130, which is then provided to the processing device 102 for user access or to inform a debug or diagnostic application being run on the processing device.

Figure 3A:
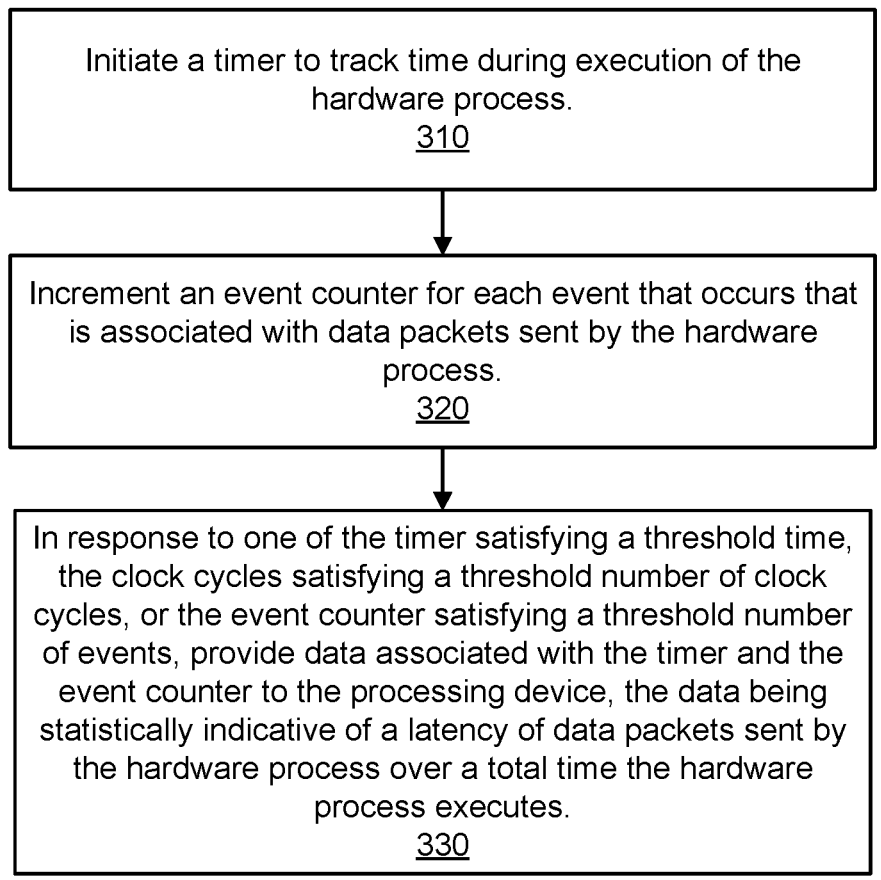
FIG. 3A is a flow diagram of a method for intelligent exposure of hardware latency statistics within an electronic device, in accordance with at least some embodiments.

FIG. 3A is a flow diagram of a method 300A for intelligent exposure of hardware latency statistics within an electronic device, in accordance with at least some embodiments. The method 300A can be performed by processing logic comprising hardware, software, firmware, or any combination thereof. In at least one embodiment, the method 300A is performed by the electronic device 100 (or system) of FIG. 1, and particularly by the NIC 120, as may be directed by the processing device 102. In at least some embodiments, the data collector 136 and/or other components of the internal logic 130 perform one or more operations.

At operation 310, the processing logic initiates the timer 132 during execution of a hardware process, e.g., the hardware process 154. The timer 132 may include or be coupled to a hardware clock by which time is tracked. In some embodiments, at operation 310, the processing logic instead initiates tracking of the clock 140 that tracks clock cycles.

At operation 320, the processing logic increments an event counter for each event that occurs that is associated with data packets sent by the hardware process 154. The event counter, for example, may be one of the counters 134 of FIG. 1 within the internal logic 130. In addition to the operation 320, the processing logic (e.g., the internal logic 130) may further detect each event as a data packet or a group of data packets sent by the hardware process. The processing logic may further detect each event as a data block encryption of data being processed by the hardware process 154. In various embodiments, a single type of event is tracked for any given period of time.

At operation 330, the processing logic, in response to the one of the timer 132 satisfying a threshold time, the clock cycles count satisfying a threshold number of clock cycles, or the event counter 134 satisfying a threshold number of events, provides data associated with the timer 132 and the event counter 134 to the processing device 102. The data (or metadata) is statistically indicative of a latency of data packets sent by the hardware process 154 over a total time the hardware process 154 executes. For example, the threshold time may be a fraction of the total time that the hardware process executes and the threshold number of events may be a fraction of a total number of events generated by the hardware process 154.

In at least some embodiments, latency statistics information located in such data/metadata that is sent (or otherwise made available) to the processing device 102 by the NIC 120 may include, but not be limited to, a number of collected events, a total accumulated time and/or values of hardware clocks, minimum/maximum latencies of a single event, and the like. This information may allow the processing device 102 to find the average numbers and/or other statistical values.

In some embodiments, to provide the data (or metadata) to the processing device 102, the NIC 120 (e.g. the internal logic 130) may package the data into a particular format such as into a packet that is readable by the processing device 102. In some embodiments, the NIC 120 directly sends the data (e.g., a metadata packet) to the processing device 102, e.g., over a PCIe or C2C bus. In other embodiments, the NIC 120 writes the data into a special memory region of the memory 110, within hardware registers (which may be in the internal memory 160, for example), or the like, which is accessible by the processing device 102. The NIC 120 may then notify the processing device 102 (e.g., by signaling an interrupt) when the data/metadata is available so that the processing device 102 can retrieve the data from a special storage location pre-configured for passing statistics-related data. In some embodiments, the data is associated with a particular filtering command (see operations 530 through 550 of FIG. 4) and thus can be recognized by the processing device 102 in association with a particular work descriptor. In these various embodiments, the data (or metadata) indicative of a latency of data packets is available to the internal logic 130 or provided to the processing device 102.

After operation 330, the processing device 102 is now in possession of the data (e.g. metadata) and may process the data to determine at least one statistical value corresponding to the latency. For example, the statistical value may include at least one of an average latency, a median latency, a maximum latency, or a minimum latency.

Figure 3B:
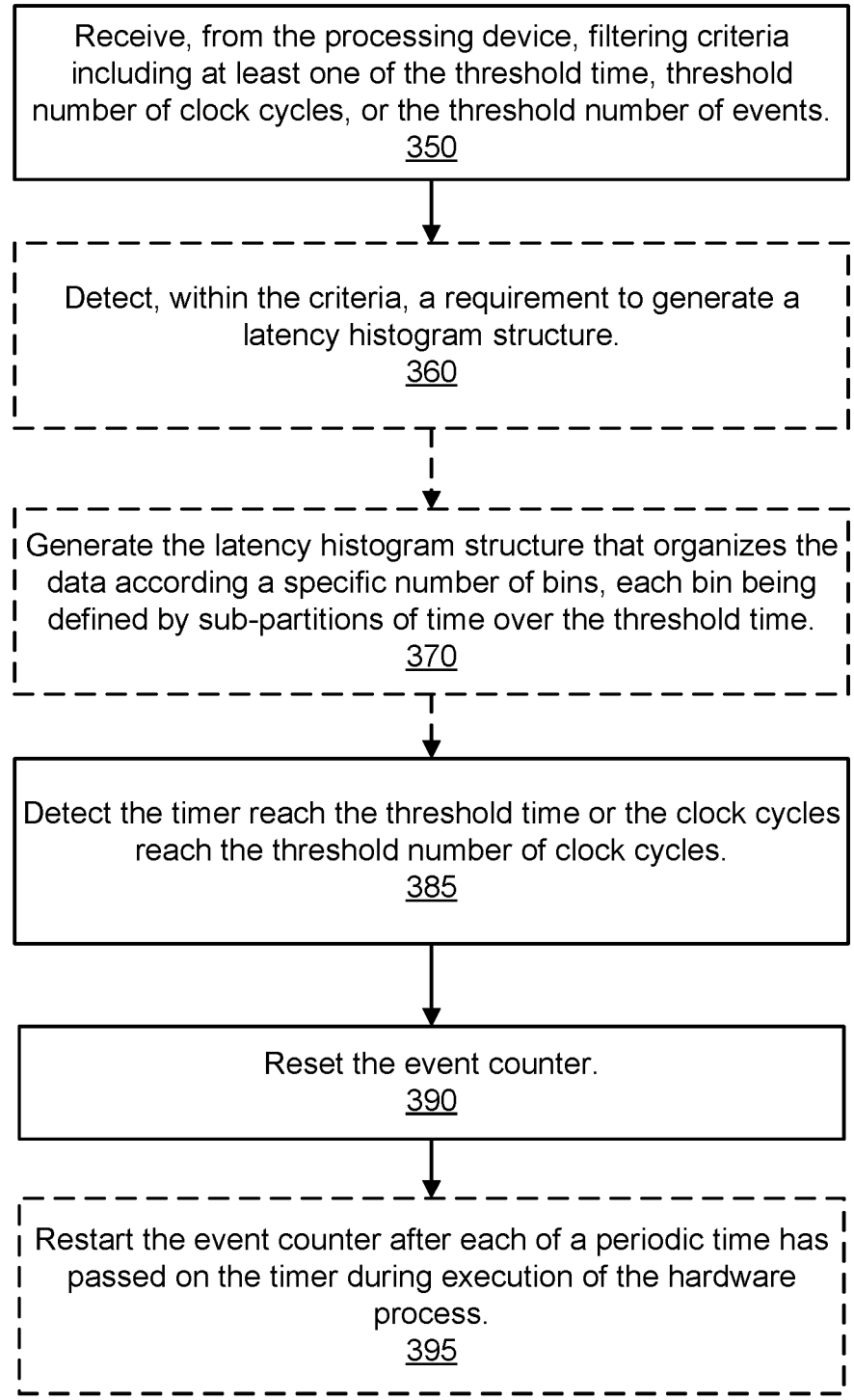
FIG. 3B is a flow diagram of a method for periodically resetting the time during which the method of FIG. 3A is performed, in accordance with at least some embodiments.

FIG. 3B is a flow diagram of a method 300B for periodically resetting the time during which the method of FIG. 3A is performed, in accordance with at least some embodiments. The method 300B can be performed by processing logic comprising hardware, software, firmware, or any combination thereof. In at least one embodiment, the method 300B is performed by the electronic device 100 (or system) of FIG. 1, and particularly by the NIC 120, as may be directed by the processing device 102. In at least some embodiments, the data collector 136, the data filter 138, and/or other components of the internal logic 130 perform one or more operations, which will be discussed.

At operation 350, the processing logic receives, from the processing device 102, filtering criteria including at least one of a threshold time or the threshold number of clock cycles for the predetermined condition or the threshold number of events. In some embodiments, the filtering criteria identifies and is specific to the hardware process 154 and specifies the hardware process or hardware resource and at least one of a particular work-consuming agent and/or particular workload characteristics. For example, each hardware process or resource may have its own relevant filtering options and those filtering options may differ across hardware process or resource. In some examples, the filtering criteria includes rules associated with the threshold time or the threshold number of events. By way of example, such rules may include gathering data for one million events, gathering data for a second, gathering data for one million events and stopping if a second passes without reaching one million events, or a periodic process of applying these rules.

In at least some embodiments, the latency measurement of a hardware process or a resource can be specified as PCI latency, a work descriptor fetch, a work data fetch, time to transmit a packet once all data sits in the data buffers 164 of the internal memory 160, a time required to scatter a received packet to the main memory 110, a time for internal cache access, external memory access after a cache miss, and the like. Other hardware processes or resources are envisioned, as these are listed merely by way of example.

In various embodiments, examples of work-consuming agents include, but are not limited to, a host number in a multi-host system, a port number in a multi-port hardware (such as the network device 118), a certain virtual machine (VM), a certain memory region such as CPU memory or GPU memory, a Quality of Service (QoS)-related priority or traffic class, an external or loopback traffic, a cache context or resource, or the like. Example workload characteristics include, but are not limited to, packets larger than X number of bytes (e.g., of over one megabyte (MB) or over a certain number of MB), time-sensitive packets (such as sent according to Precision Time Protocol (PTP)), prioritized packets, packets that were sent in the first certain number of milliseconds (ms) of every other statistics-gathering iteration (or the like), tasks associated with video content, and other such workload characteristics.

In various embodiments, as part of providing filtering criteria to the internal logic 130, the processing device 102 also defines threshold values, and the NIC 120 will notify the processing device 102 whenever a minimum, a maximum, or an average latency reaches specified thresholds, with consideration of the filtering mechanism proposed above. For example, the NIC 120 may notify the processing device 102 whenever PCI latency of workload of a given work queue reaches a particular number of milliseconds (ms) or microseconds or whenever access to the cache drops below a certain number of microseconds (µs). In this way, the processing device 102 may trigger some adjustment to the workload to reduce the latency. The processing device may also identify non-optimum performance of a PCIe bus/channel, or other work-consuming agent that is the cause of a certain high level of latency.

At optional operation 360, the processing logic, before providing the data to the processing device (at operation 330), detects, within the criteria, a requirement to generate a latency histogram structure.

At optional operation 370 (when operation 360 is performed), the processing logic generates the latency histogram structure that organizes the data according a specific number of bins, each bin being defined by sub-partitions of time over the threshold time. In these embodiments, the processing logic provides the data in the form of the latency histogram structure to the processing device 102. As just one example for purposes of explanation, the histogram may be configured as illustrated in Table 1.

TABLE 1

|  | Time Bin | | | |
| --- | --- | --- | --- | --- |
|  | 0 to 100 ns | 100 ns to 1 μs | 1 μs to 10 μs | more than 10 μs |
| # Events | 100 | 1000 | 2000 | 10 |

At operation 385, the processing logic detects the measured execution time (e.g., the value of the timer 132) has reached the threshold time, e.g., which was supplied by the processing device 102 as part of the criteria. In the alternative, at operation 385, the processing logic detects the number of clock cycles of the clock 160 has reached the threshold number of clock cycles.

At operation 390, the processing logic resets the event counter 134, e.g., in response to detecting the measured execution time has reached the threshold time or to the number of clock cycles reaching the threshold number of clock cycles.

At optional operation 395, the processing logic restarts the event counter 134 after each of a periodic time has passed during execution of the hardware process. Operation 395 may enable automating the sampling of the latency-statistics-related data after every periodic time to ensure a constant flow of the data (e.g., metadata) that the internal logic 130 and/or processing device 102 can use to generate a latency-related statistical value as discussed herein. The periodic time may be, only by way of example, one second or two seconds every minute, e.g., to enable time-based sampling. In various embodiments, performing operation 395 is in lieu of or in addition to performing operation 385 and operation 390. The periodic time may also be tracked with clock cycles of the clock 140.

Figure 4:
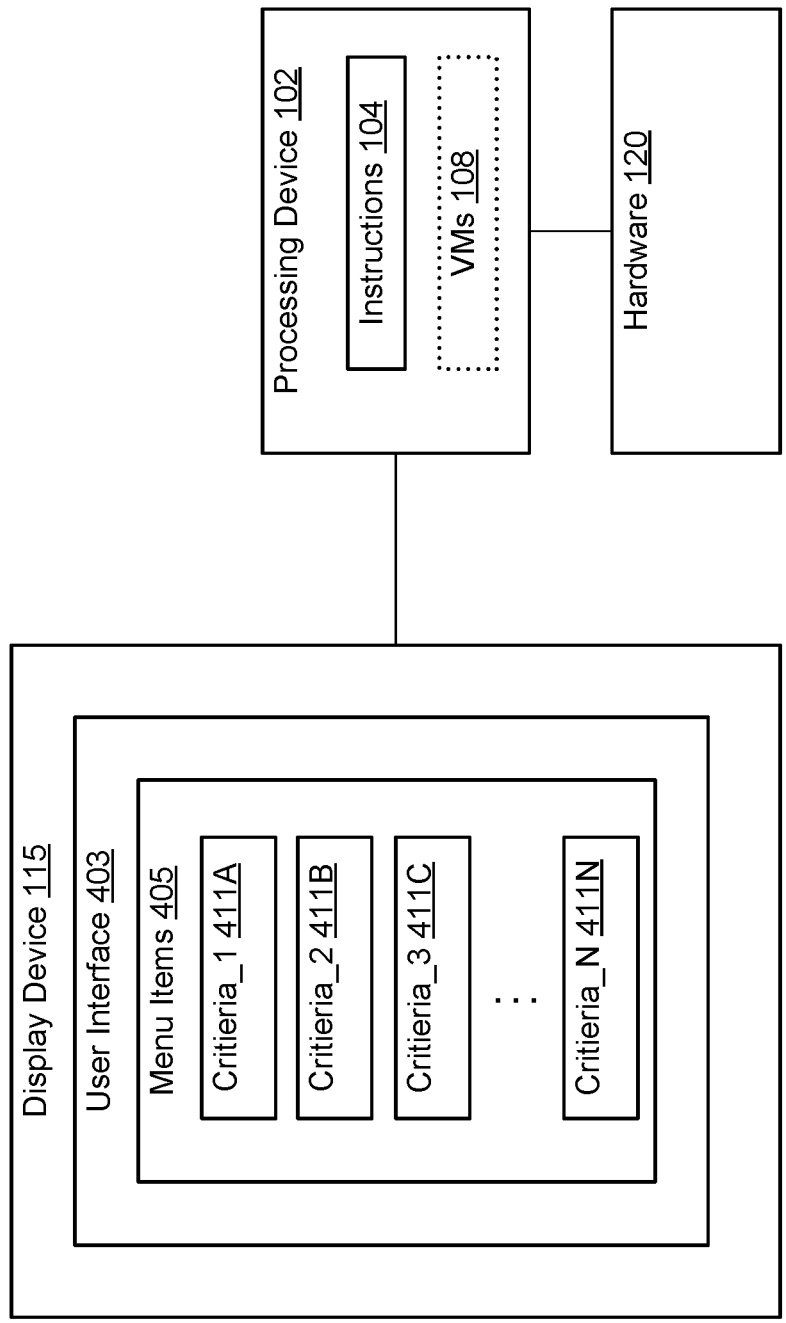
FIG. 4 is a simplified block diagram including a user interface through which to control filtering criteria for the latency statistics, in accordance with at least some embodiments.

FIG. 4 is a simplified block diagram including a user interface 403 through which to control filtering criteria for the latency statistics, in accordance with at least some embodiments. The user interface 403 may be displayed on the display device 115 of the electronic device 100 (or system) discussed with reference to FIG. 1. The processing device 102 may deliver a set of menu items 405 to the display device 115 for illustration within the user interface 403. The set of menu items 405, for example, may include a number of different criteria, such as a first criteria 441A, a second criteria 411B, a third criteria 411C, and so forth through an Nth criteria 411N. These various criteria were discussed by way of example with reference to operation 350 of the method 300B of FIG. 3B.

Figure 5:
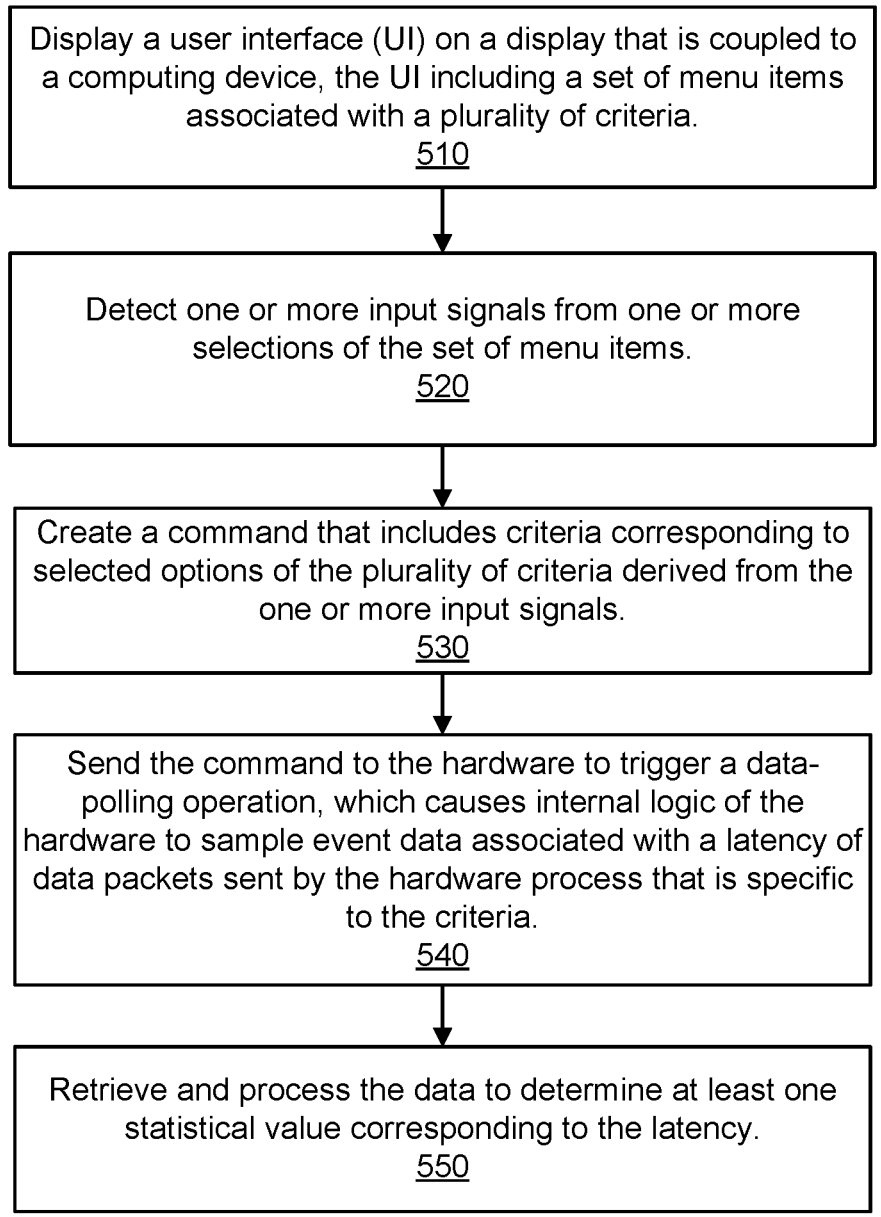
FIG. 5 is a flow diagram of a method for receiving and applying criteria to generation of a polling operation that triggers internal logic to sample particular event data for a particular time period, in accordance with at least some embodiments.

FIG. 5 is a flow diagram of a method 500 for receiving and applying criteria to generation of a polling operation that triggers internal logic to sample particular event data for a particular time period, in accordance with at least some embodiments. The method 500 can be performed by processing logic comprising hardware, software, firmware, or any combination thereof. In at least one embodiment, the method 500 is performed by the electronic device 100 (or system) of FIG. 1, and particularly by the processing device 102 in directing the NIC 120 using a command that includes polling criteria as related to statistics-specific information, and in processing the statistics-specific information received back in the form of metadata.

At operation 510, the processing logic displays the user interface 403 on a display (e.g., the display device 115) that is coupled to a device such as the electronics device 100 (or system). The user interface 403 includes the set of menu items 405 associated with a plurality of criteria. In various embodiments, the plurality of criteria is to specify options for at least one of: a hardware process and corresponding hardware resource to be monitored within hardware of the communications device with regards to latency-related statistics; a work-consuming agent for the hardware process; or workload characteristics associated with data packets sent by the hardware process or corresponding hardware resource. These various aspects of the criteria were discussed with reference to operation 350 of the method 300B of FIG. 3B. Just by way of example, the criteria may include that a data-polling operation is to be triggered periodically according to a periodic time or the event data is to be returned within a configurable latency histogram structure, among other examples of criteria discussed herein.

At operation 520, the processing logic detects one or more input signals from one or more selections of the set of menu items.

At operation 530, the processing logic creates a command that includes criteria corresponding to selected options of the plurality of criteria derived from the one or more input signals. The command may further include a work descriptor that indicates to the NIC 120 a certain type and amount of work to do, e.g., which may trigger the data collector 136 to collect a particular type of statistics-related data and the data filter 138 to package or process that data in a particular way to format the data in a digestible format for use by the processing device 102.

At operation 540, the processing logic sends the command to the NIC 120 to trigger a data-polling operation, which causes internal logic 130 of the NIC 120 to sample event data associated with a latency of data packets sent by the hardware process that is specific to the criteria.

At operation 550, the processing logic retrieves and processes the data to determine at least one statistical value corresponding to the latency, the at least one statistical value comprising at least one of an average latency, a median latency, a maximum latency, or a minimum latency. In at least one embodiment, the retrieving the data is performed by detecting an interrupt set by the internal logic that indicates availability of the event data and retrieving, responsive to the detecting, the event data from the internal memory 160 of the NIC 120. In another embodiment, the retrieving the data is performed by sending a query request to the internal logic 130 after a predetermined period of time and receiving the event data from the internal logic 130 in response to the request. In various embodiments, the data (that includes the statics-related information) includes an amount of time that the hardware process was monitored, a total time that the hardware process executed, and a total number of events that were counted during the monitoring.

In some embodiments, with additional reference to FIG. 1, whenever a new data fetch process starts, the hardware block 150 responsible for the process notifies the internal logic 130 (e.g., the data collector 136), which then knows to start tracking time and events associated with data packet or data encryption latency. In these embodiments, the notification passes if an event meets the filtering criteria, which criteria has been discussed in detail by way of example. When the hardware process 154 finishes, and all required data was fetched and sits in the internal memory 160 of the NIC 120, the hardware block 150 responsible for the process may notify the internal logic 130 (e.g., the data collector 136) that the process has been finished. If several simultaneous processes can be executed at the same time (not "one in the air" process), an identifier of the specific hardware process 154 can be given together with the start and stop events, so that the data collector 136 will be able to correlate the different starts with stops.

In at least some embodiments, the data collector 136 starts counting events when the hardware process 154 starts and waits until the hardware process 154 stops. Then, the data collector 136 may take the measured time (e.g., in nanoseconds (ns) or clock cycles), and add the measured time to the previously collected statistics. For example, if the collected data includes (minimum latency, maximum latency, total events, total time), then the gathered information may be updated as follows, by way of example:

If new event time<minimum time, then replace minimum with the new time.
If new event time>maximum time, then replace maximum with the new time.
Total time=previous total time+new event time.
Number of events=previous number of events+1.

In various embodiments, the NIC 120 supports several instances of the same event type being executed at the same time. For example, up to 10 packets that are being fetch at any given time, rather than "one packet in the air." In this case, the same parallelism can be added to the latency statistics collection logic (e.g., within the data collector 136) of the data fetch event, so that latency of up to 10 events may be counted in parallel. Such parallelism may further build into the latency-related data collection additional efficiencies are bandwidth savings.

In some embodiments, the data collector 136 also counts fewer events in parallel as well, such as single count at any given time. This might be understood as an opportunistic mechanism, in which an event will pass into the actual counting mechanism only if the counting mechanism (such as a particular event counter) is empty or available. In this case, the data collector 136 may "lose" some events, but the latency statistics information collected in this way can still provide a valuable data. For example, assuming steady state behavior of the electronics device 100 (or system), gathering statistics of 1 million events, out of total 10 million events, will probably give a close to a complete knowledge regarding latency behavior, such as minimum, maximum, and average values. A decision whether to use a fully-capable counter for all events or one with less parallelism would be an instantiation trade off, since a latency statistics collection block (such as the data collector 136) that catches all relevant events may require additional hardware logic real estate, translating to higher production price. Some events will require the entire knowledge, and some may not, for example.

If several user applications (such as several of the VMs 108) would like to use the same latency counter in parallel, a Quality of Service (QoS) mechanism can be defined, in order to be able to serve all user applications, have an expected behavior, and avoid possible starvation of statistics data to any one user application. For example, if several of the VMs 108 request for data fetch latency statistics according to different filters, the NIC 120 can be set to be allocated for the VMs in a Time Division Multiplexing (TDM) fashion. For example, if the VMs 108 are four in number, each VM may be allocated 25% of the counting time each, and use the data collector 136 one after the other, or every VM will get the chance to count 1 million events, and then the counting resource will pass to the next one.

In additional embodiments, other resource allocation rules and patterns can be defined, such as configurable weights between the different VMs 108, so that the system administrator can allocate more latency statistics collection resources to a certain user application or VM. A data filter 138 that supports several filters can also be implemented, so that several user applications can able to gather latency statistics in parallel, using different event filters.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device, a NIC, or an accelerator. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A device comprising:
a hardware block to perform a hardware process; and
internal logic coupled between a processing device, which executes instructions, and the hardware block, the internal logic to:
one of measure an execution time or count clock cycles of at least a portion of the hardware process; and
in response to the measured execution time satisfying a threshold time or the counted clock cycles satisfying a threshold number of clock cycles, provide data associated with the one of the execution time measurement or the clock cycles count to the processing device, the data being statistically indicative of a latency of data packets sent by the hardware process over a total time the hardware process executes.

2. The device of claim 1, further comprising the processing device, wherein the processing device is to process the data to determine at least one statistical value corresponding to the latency, the at least one statistical value comprising at least one of an average latency, a median latency, a maximum latency, or a minimum latency.

3. The device of claim 1, further comprising an internal memory coupled to the internal logic and accessible by the processing device, wherein to provide the data to the processing device, the internal logic is further to at least one of:
store the data to the internal memory and send an interrupt to the processing device that indicates availability of the data; or
receive a request for the data from the processing device and reply to the request with a message containing the data.

4. The device of claim 1, wherein to measure the execution time comprises to initiate and track a timer, and in response to the timer satisfying the threshold time, providing the data associated with the timer to the processing device, wherein the threshold time is a fraction of the total time that the hardware process executes.

5. The device of claim 1, wherein to count the clock cycles comprises to track clock cycles of a clock during execution of the hardware process, and in response to the clock cycles satisfying the threshold number of clock cycles, providing the data associated with the clock to the processing device, wherein the threshold number of clock cycles is a fraction of total clock cycles over which the hardware process executes.

6. The device of claim 1, wherein the internal logic is further to:
increment an event counter for each event that occurs that is associated with data packets sent by the hardware process; and
in response to the event counter satisfying a threshold number of events, providing the data associated with the event counter to the processing device, wherein the threshold number of events is a fraction of a total number of events generated by the hardware process.

7. The device of claim 6, wherein the internal logic further detects each event as one of:
a data packet or a group of data packets sent by the hardware process; or
a data block encryption of data being processed by the hardware process.

8. The device of claim 6, wherein the internal logic is further to receive, from the processing device, filtering criteria comprising at least one of the threshold time or the threshold number of events.

9. The device of claim 8, wherein the filtering criteria further causes the internal logic to:
detect the measured execution time has reached the threshold time; and
reset the event counter in response to the detection.

10. The device of claim 8, wherein the filtering criteria identifies and is specific to the hardware process and specifies at least one of a particular work-consuming agent or particular workload characteristics.

11. The device of claim 8, wherein the internal logic is further to, before providing the data to the processing device:
detect, within the criteria, a requirement to generate a latency histogram structure; and
generate the latency histogram structure that organizes the data according a specific number of bins, each bin being defined by sub-partitions of time over the threshold time.

12. The device of claim 1, wherein the hardware block is a part of a network interface card (NIC), a data processing unit (DPU), a graphics processing unit (GPU), or a central processing unit (CPU).

13. A method comprising:
initiating a hardware process using a hardware block of an electronic device;
one of measuring or counting, using internal logic coupled between a processing device and the hardware block of the electronic device, execution time or clock cycles, respectively, of at least a portion of the hardware process; and
in response to the measured execution time satisfying a threshold time or the counted clock cycles satisfying a threshold number of clock cycles, providing, by the internal logic, data associated with the one of the measured execution time or the clock cycles count to the processing device, the data being statistically indicative of a latency of data packets sent by the hardware process over a total time the hardware process executes.

14. The method of claim 13, further comprising processing, by at least one of the internal logic or the processing device, the data to determine at least one statistical value corresponding to the latency, the at least one statistical value comprising at least one of an average latency, a median latency, a maximum latency, or a minimum latency.

15. The method of claim 13, wherein providing the data to the processing device comprises at least one of:
storing the data to an internal memory of the internal logic and sending an interrupt to the processing device that indicates availability of the data; or
receiving a request for the data from the processing device and replying to the request with a message containing the data.

16. The method of claim 13, wherein measuring the execution time comprises initiating and tracking a timer, and in response to the timer satisfying the threshold time, providing the data associated with the timer to the processing device, wherein the threshold time is a fraction of the total time that the hardware process executes.

17. The method of claim 13, wherein counting the clock cycles comprises tracking clock cycles of a clock during execution of the hardware process, and in response to the clock cycles satisfying the threshold number of clock cycles, providing the data associated with the clock to the processing device, wherein the threshold number of clock cycles is a fraction of total clock cycles over which the hardware process executes.

18. The method of claim 13, further comprising:
incrementing an event counter for each event that occurs that is associated with data packets sent by the hardware process; and
in response to the event counter satisfying a threshold number of events, providing the data associated with the event counter to the processing device, wherein the threshold number of events is a fraction of a total number of events generated by the hardware process.

19. The method of claim 18, further comprising detecting each event as one of:
a data packet or a group of data packets sent by the hardware process; or
a data block encryption of data being processed by the hardware process.

20. The method of claim 18, further comprising receiving, from the processing device, filtering criteria comprising at least one of the threshold time, the threshold number of clock cycles, or the threshold number of events.

21. The method of claim 20, further comprising the filtering criteria triggering the internal logic in:
detecting the one of the measured execution time has reached the threshold time or the counted clock cycles has reached the threshold number of clock cycles;
resetting the event counter; and
restarting the event counter after each of a periodic time has passed during execution of the hardware process.

22. The method of claim 20, wherein the filtering criteria identifies and is specific to the hardware process and specifies at least one of a particular work-consuming agent or particular workload characteristics.

23. The method of claim 20, further comprising, before providing the data to the processing device:
detecting, within the criteria, a requirement to generate a latency histogram structure; and
generating the latency histogram structure that organizes the data according a specific number of bins, each bin being defined by sub-partitions of time over the threshold time.

24. A method comprising:
initiating, by internal logic of hardware of a device, one of a time measurement or a clock cycle count during execution of a hardware process of the hardware;
incrementing, by the internal logic, an event counter for each event that occurs that is associated with the hardware process; and
responsive to detecting at least one of the time measurement satisfying a threshold time, the clock cycle count satisfying a threshold number of clock cycles, or the event counter satisfying a threshold number of events, processing, by the internal logic, data associated with the time measurement and the event counter to determine at least one statistical value corresponding to a latency of the hardware process execution.

25. The method of claim 24, wherein the at least one statistical value comprises at least one of an average latency, a median latency, a maximum latency, or a minimum latency, the method further comprising providing the at least one statistical value to a processing device of the device, the processing device configured to execute instructions.

26. The method of claim 24, wherein the initiating the time measurement comprises initiating a timer.

27. The method of claim 24, wherein counting the clock cycles comprises tracking clock cycles of a clock during execution of the hardware process, and in response to the clock cycles satisfying the threshold number of clock cycles, providing the data associated with the clock to a processing device, wherein the threshold number of clock cycles is a fraction of total clock cycles over which the hardware process executes.

28. A device comprising:
a hardware block to perform a hardware process; and
initiating, by internal logic of hardware of a device, one of a time measurement or a clock cycle count during execution of a hardware process of the hardware;
incrementing, by the internal logic, an event counter for each event that occurs that is associated with the hardware process; and responsive to detecting a predetermined condition associated with at least one of the time measurement satisfying a threshold time, the clock cycle count satisfying a threshold number of clock cycles, or the event counter satisfying a threshold number of events, processing, by the internal logic, data associated with the time measurement and the event counter to determine at least one statistical value corresponding to a latency of the hardware process execution.

29. The device of claim 28, further comprising the processing device, wherein the processing device is to process the data to determine at least one statistical value corresponding to the latency, the at least one statistical value comprising at least one of an average latency, a median latency, a maximum latency, or a minimum latency.

30. The device of claim 28, further comprising an internal memory coupled to the internal logic and accessible by the processing device, wherein to provide the data to the processing device, the internal logic is further to at least one of:
store the data to the internal memory and send an interrupt to the processing device that indicates availability of the data; or
receive a request for the data from the processing device and reply to the request with a message containing the data.

31. The device of claim 28, wherein the determined parameter value comprises a measured execution time and satisfying the predetermined condition comprises the measured execution time satisfying a threshold time.

32. The device of claim 31, wherein the internal logic is further to:
measure an execution time by initiating and tracking a timer; and
in response to the timer satisfying the threshold time, providing the data associated with the timer to the processing device, wherein the threshold time is a fraction of the total time that the hardware process executes.

33. The device of claim 28, wherein the determined parameter value comprises counted clock cycles and satisfying the predetermined condition comprises the counted clock cycles satisfying a threshold number of clock cycles.

34. The device of claim 33, wherein the internal logic is further to:
to count clock cycles by tracking the clock cycles of a clock during execution of the hardware process; and
in response to the clock cycles satisfying the threshold number of clock cycles, providing the data associated with the clock to the processing device, wherein the threshold number of clock cycles is a fraction of total clock cycles over which the hardware process executes.

35. The device of claim 28, wherein the determined parameter value comprises an event counter value and satisfying the predetermined condition comprises the event counter value satisfying a threshold number of events.

36. The device of claim 35, wherein the internal logic is further to:
- increment an event counter for each event that occurs that is associated with data packets sent by the hardware process; and
- in response to the event counter value satisfying a threshold number of events, providing the data associated with the event counter value to the processing device, wherein the threshold number of events is a fraction of a total number of events generated by the hardware process.

37. The device of claim 35, wherein the internal logic is further to detect each event as one of:
- a data packet or a group of data packets sent by the hardware process; or
- a data block encryption of data being processed by the hardware process.

\* \* \* \* \*